(12) United States Patent
Iorio

(10) Patent No.: US 10,740,430 B2
(45) Date of Patent: Aug. 11, 2020

(54) ANALYTICS-DRIVEN GLOBAL OPTIMIZATION STRATEGY SELECTION AND REFINEMENT

(71) Applicant: AUTODESK, INC., San Rafael, CA (US)

(72) Inventor: Francesco Iorio, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 486 days.

(21) Appl. No.: 14/082,672

(22) Filed: Nov. 18, 2013

(65) Prior Publication Data

US 2014/0149331 A1 May 29, 2014

Related U.S. Application Data

(60) Provisional application No. 61/730,477, filed on Nov. 27, 2012.

(51) Int. Cl.
*G06F 17/11* (2006.01)
*G06Q 10/06* (2012.01)

(52) U.S. Cl.
CPC ............ *G06F 17/11* (2013.01); *G06Q 10/06* (2013.01)

(58) Field of Classification Search
CPC .......... G06N 5/02; G06F 17/11; G06Q 10/06
See application file for complete search history.

(56) References Cited

U.S. PATENT DOCUMENTS

| | | | | |
|---|---|---|---|---|
| 6,401,057 B1* | 6/2002 | Kadtke | ............... | G06K 9/6217 |
| | | | | 702/189 |
| 6,633,857 B1* | 10/2003 | Tipping | ............... | G06N 3/0472 |
| | | | | 706/16 |
| 2005/0038780 A1* | 2/2005 | de Souza | ............... | G06Q 10/00 |
| 2013/0007527 A1* | 1/2013 | Petukhov | ............ | G06F 11/0793 |
| | | | | 714/37 |
| 2013/0031140 A1* | 1/2013 | Ferringer | ............... | G06N 3/126 |
| | | | | 707/802 |

OTHER PUBLICATIONS

Konak, Abdullah, David W. Coit, and Alice E. Smith. "Multi-objective optimization using genetic algorithms: A tutorial." Reliability Engineering & System Safety 91.9 (2006): 992-1007. (Year: 2006).*

\* cited by examiner

*Primary Examiner* — Vincent Gonzales
*Assistant Examiner* — Kevin W Figueroa
(74) *Attorney, Agent, or Firm* — Artegis Law Group, LLP

(57) ABSTRACT

A centralized optimization engine is configured to receive a problem specification that defines an optimization problem to be solved. The optimization engine classifies the problem specification within a large dataset of previously solved optimization problems. The optimization engine selects one or more solution strategies associated with similar optimization problems, and then executes those solution strategies to solve the optimization problem. Over time, the optimization engine updates the large data set with statistical information that reflects the performance of different solution strategies applied to various optimization problems, thereby increasing the effectiveness with which optimization problems may be solved.

18 Claims, 12 Drawing Sheets

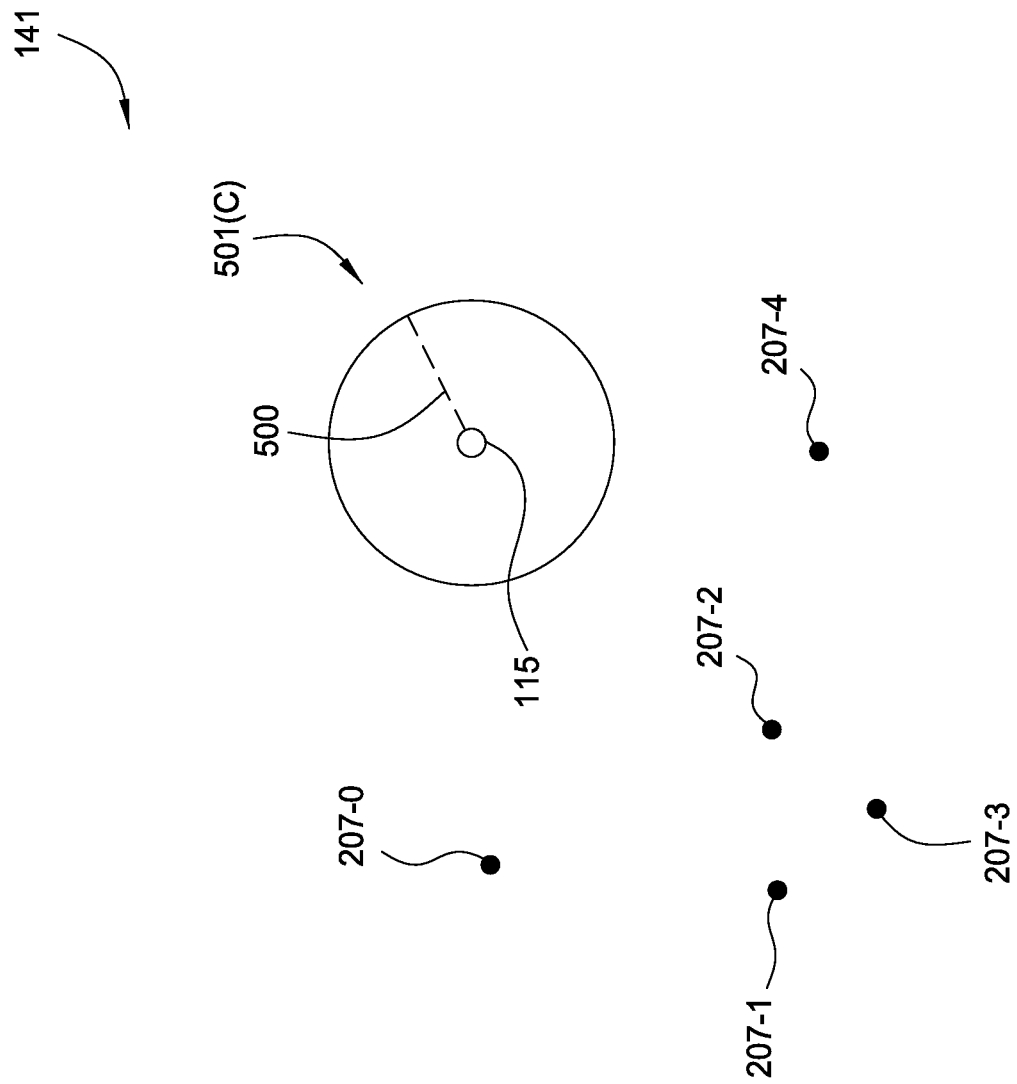

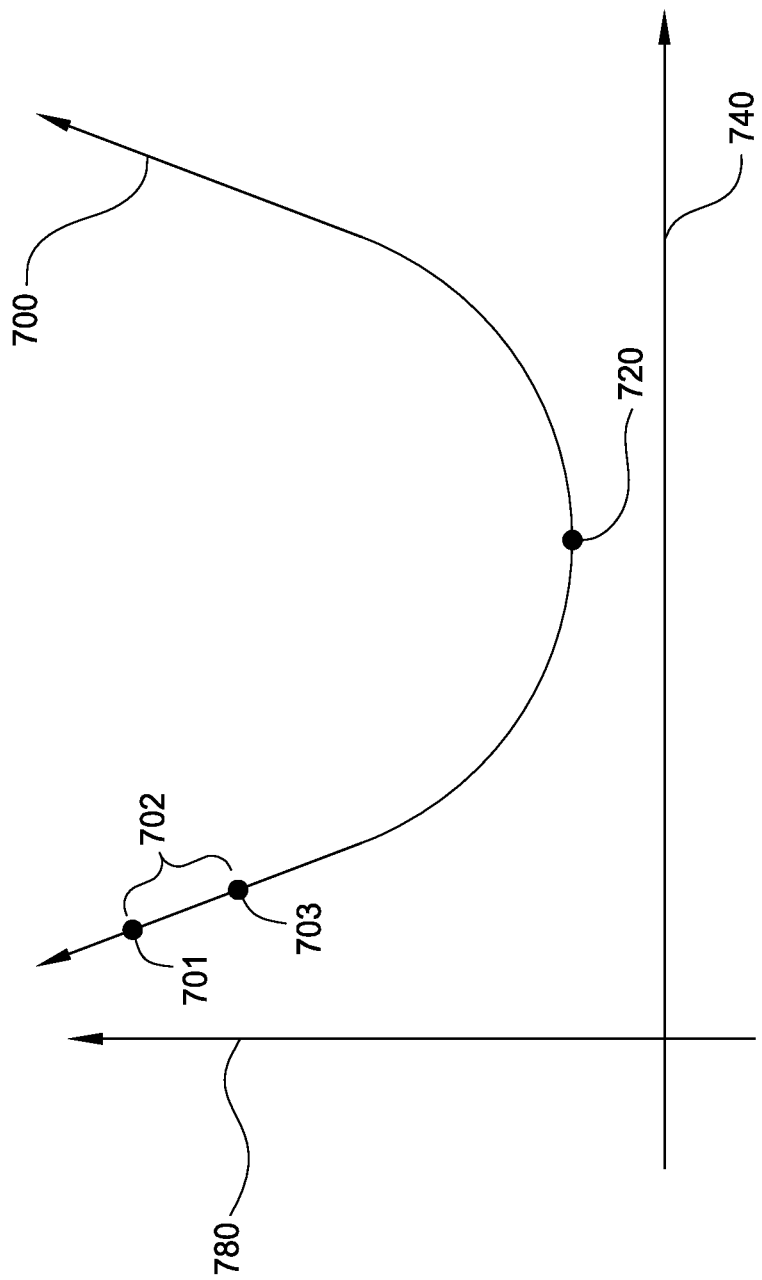

ANALYTICS-DRIVEN GLOBAL OPTIMIZATION STRATEGY SELECTION AND REFINEMENT

CROSS-REFERENCE TO RELATED APPLICATIONS

This application claims the benefit of U.S. provisional patent application titled "Analytics-Driven Global Optimization Strategy Selection and Refinement," filed on Nov. 27, 2012 and having Ser. No. 61/730,477. The subject matter of this related application is hereby incorporated herein by reference.

BACKGROUND OF THE INVENTION

Field of the Invention

The present invention generally relates to mathematical optimization and, more specifically, to analytics-driven global optimization strategy selection and refinement.

Description of the Related Art

Mathematical optimization includes a wide variety of different techniques for identifying a combination of parameters that meets one or more objectives. The combination of parameters could relate to any particular domain, including engineering problems such as structural design, financial problems such as portfolio optimization, and so forth. Generally, techniques for performing mathematical optimization include applying different algorithms that vary a set of parameters until an objective function is maximized or minimized.

An expert in mathematical optimization typically approaches an optimization problem by identifying the particular problem domain and then selecting an optimization algorithm that is appropriate for that domain. The expert then defines a set of hyperparameters than control the functionality of the optimization algorithm. The selected optimization algorithm may then be executed with the hyperparameters to search for optimal combinations of parameters. Typically, the expert continuously monitors the performance of the algorithm to ensure that converge occurs. However, as is often the case, many optimization algorithms must be manually selected and applied until a successful strategy can be found.

The manual approach described above is a painstaking and error-prone process, even for experts in mathematical optimization. Consequently, this approach is generally inaccessible for non-experts, who lack the domain-specific knowledge to perform any of the manual steps discussed above.

As the foregoing illustrates, what is needed in the art is a more effective approach to performing mathematical optimization.

SUMMARY OF THE INVENTION

One embodiment of the present invention sets forth a computer-implemented method for solving an optimization problem, including receiving a problem specification that reflects the optimization problem, classifying the problem specification within a problem/solution space that includes a plurality of stored problem specifications and a corresponding plurality of stored solution strategies, identifying one or more stored problem specifications in the plurality of stored problem specifications that are similar to the problem specification, selecting one or more stored solution strategies in the plurality of stored solution strategies that correspond to the one or more stored problem specifications, and executing the one or more stored solution strategies to generate a solution to the optimization problem.

One advantage of the disclosed technique is that the end-user is not required to have domain-specific knowledge of optimization techniques, and so a much wider class of end-users may be capable of solving optimization problems

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A-5C are conceptual diagrams that illustrate exemplary classifications of an optimization problem, according to one embodiment of the present invention;

FIGS. 7A-7C are conceptual diagrams that illustrate exemplary performance of an optimization algorithm, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
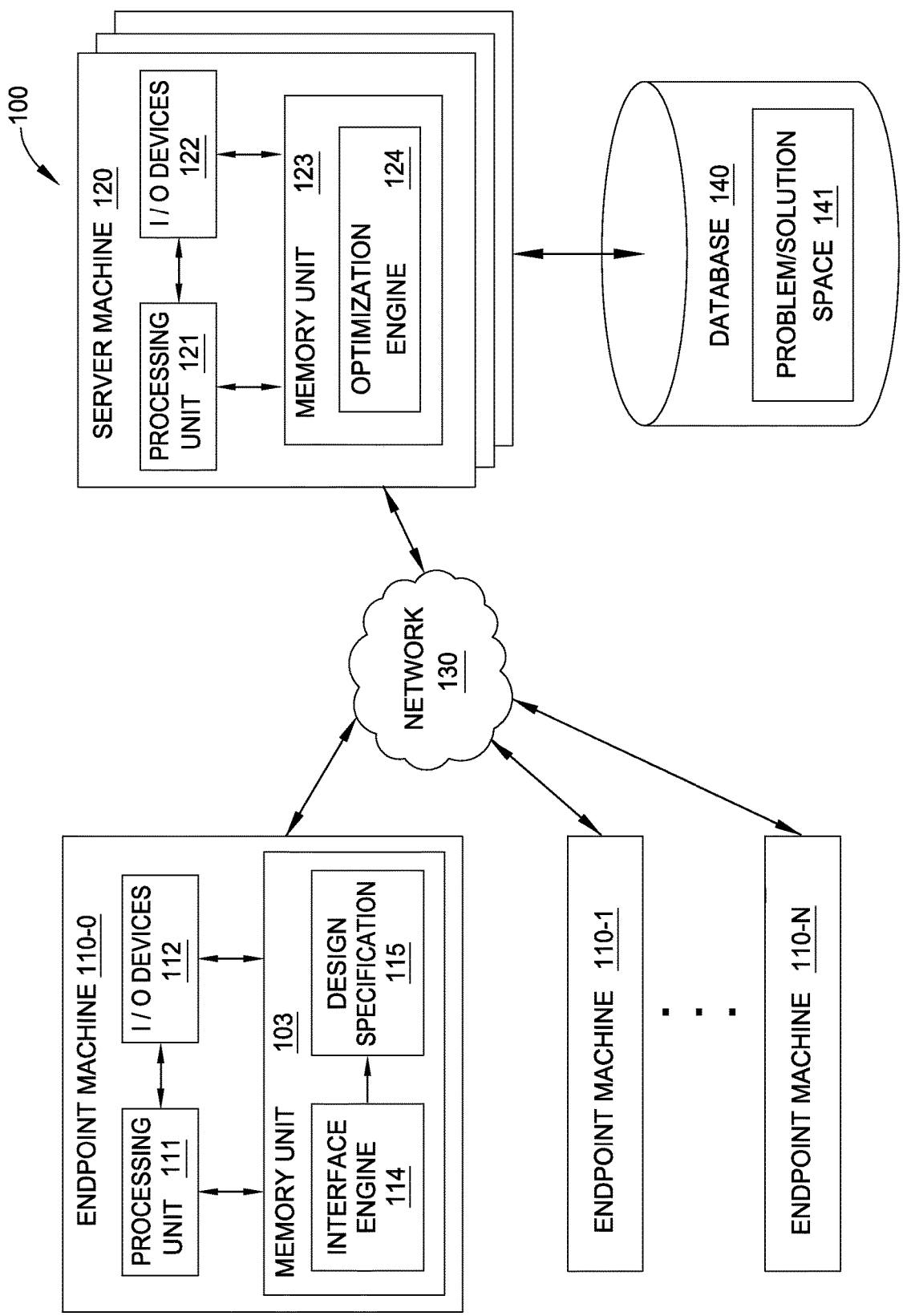
FIG. 1 illustrates a system configured to implement one or more aspects of the present invention.

FIG. 1 illustrates a system 100 configured to implement one or more aspects of the present invention. As shown, system 100 includes endpoint machines 100-0 through 100-N coupled to a server machine 120 by a network 130. Server machine 120 is also coupled to a database 140. Endpoint machines 110-0 through 110-N (referred to generally as endpoint machines 110), represent client computing devices configured to interact with server machine 120 in order to generate solutions to optimization problems. Each endpoint machine 110 may be a desktop computing device, a laptop computing device, or another type of remote client computing device. Endpoint machine 110-0 represents an exemplary instance of an endpoint machine 110, the details of which are described in greater detail below.

As is shown, endpoint machine 110-0 includes a processing unit 111, input/output (I/O) devices 112, and a memory unit 113 coupled to one another. Memory unit 113 includes an interface engine 114 and a problem specification 115. Processing unit 111 may be any technically feasible hardware unit capable of processing data, including a central processing unit (CPU), graphics processing unit (GPU), and so forth. I/O devices 112 may include devices capable of receiving input, including a keyboard, mouse, etc., devices capable of generating output, including a display device, speaker, etc., and devices capable of receiving input and generating output, including a touchscreen, universal serial bus (USB) port, etc. Memory unit 113 is a storage device capable of storing software applications that may be executed by processing unit 111, such as interface engine 114, as well as data generated by processing unit 111, such as problem specification 115.

Interface engine 114 may be executed by processing unit 111 to generate an interface, such a graphical user interface (GUI), with which an end-user of endpoint machine 110-0 may interact in order to define an optimization problem. Interface engine 114 could be a desktop software application, a client-side web application, a web browser configured to display a web page, or any other technically feasible client-side software program. Interface engine 114 receives various data from the end-user that reflects different attributes of the optimization problem to be solved, including a specific problem domain to which the optimization problem belongs, a set of parameters associated with the optimization problem, a set of constraints associated with the optimization problem, and a set of objective functions associated with the optimization problem. Interface engine 114 then generates problem specification 115 to include the aforementioned data. Generally, problem specification 115 could be any data structure that reflects an optimization problem to be solved. Interface engine 114 is configured to transmit problem specification 115 to server machine 120. Server machine 120 may then generate a solution to that optimization problem.

Server machine 120 is a computing device that may reside within a datacenter that also includes other, similar instances of server machine 120. Server machine 120 includes a processing unit 121, I/O devices 122, and a memory unit 123 coupled to one another. Processing unit 121, I/O devices 122, and memory unit 123 represent generic computer components that may be similar in nature to processing unit 111, I/O devices 112, and memory unit 113, respectively. Memory unit 123 includes an optimization engine 124 that, when executed by processing unit 121, attempts to generate a solution to the optimization problem defined by problem specification 115. In doing so, optimization engine 124 is configured to interact with database 140 to access historical solutions to optimization problems.

Database 140 is a storage device configured to store large amounts of data. Database 140 may reside within the same datacenter that includes server machine 120 or may reside elsewhere. Database 140 includes a problem/solution space 141 that represents a mapping between previously solved optimization problems and historical data that reflects the different approaches used to solve those optimization problems. In its simplest form, problem/solution space 141 may include a 1:1 mapping between each stored problem specification and the one or more optimization algorithms used to solve the optimization problem associated with each such problem specification. However, in practice, problem/solution space 141 includes a wide variety of data for each stored problem specification. For a given problem specification stored in problem/solution space 141, problem/solution space 141 may also include one or more solution strategies that reflect prescribed sequences of optimization algorithms to be executed, termination conditions for each such algorithm, as well as performance data that reflects the statistical performance of the solution strategies during previous execution. The contents of problem/solution space 141 are described in greater detail below in conjunction with FIG. 2, and an exemplary solution strategy is described in greater detail below in conjunction with FIG. 3.

Optimization engine 124 is configured to classify problem specification 115 by mapping that problem specification to similar problem specifications stored within problem/solution space 141. In doing so, optimization engine 124 may implement a distance function or other comparative algorithm to determine a correlation value between problem specification 115 and each stored problem specification included in problem/solution space 141. Optimization engine 124 then identifies solution strategies associated with the stored problem specifications with which problem specification 115 is most strongly correlated. The classification functionality described briefly above is also described in greater detail below in conjunction with FIGS. 4-5C.

Once a solution strategy or strategies have been identified, optimization engine 124 may then execute the optimization algorithms prescribed by those solution strategies in order to generate a solution to the optimization problem associated with problem specification 115. Optimization engine 124 then updates problem/solution space 141 to reflect the performance of those solution strategies when applied to problem specification 115. The strategy execution functionality described briefly above is also described in greater detail below in conjunction with FIGS. 6-7C.

Conceptually, optimization engine 124 is configured to rely on past experience generated when solving previous optimization problems in order to improve the speed and accuracy with which a solution may be generated to new optimization problems. With this approach, the performance of optimization engine 124 may improve over time as problem/solution space 141 evolves to become a more complete representation of the set of optimization problems encountered by end-users, and the successful solutions to those optimization problems.

Figure 2:
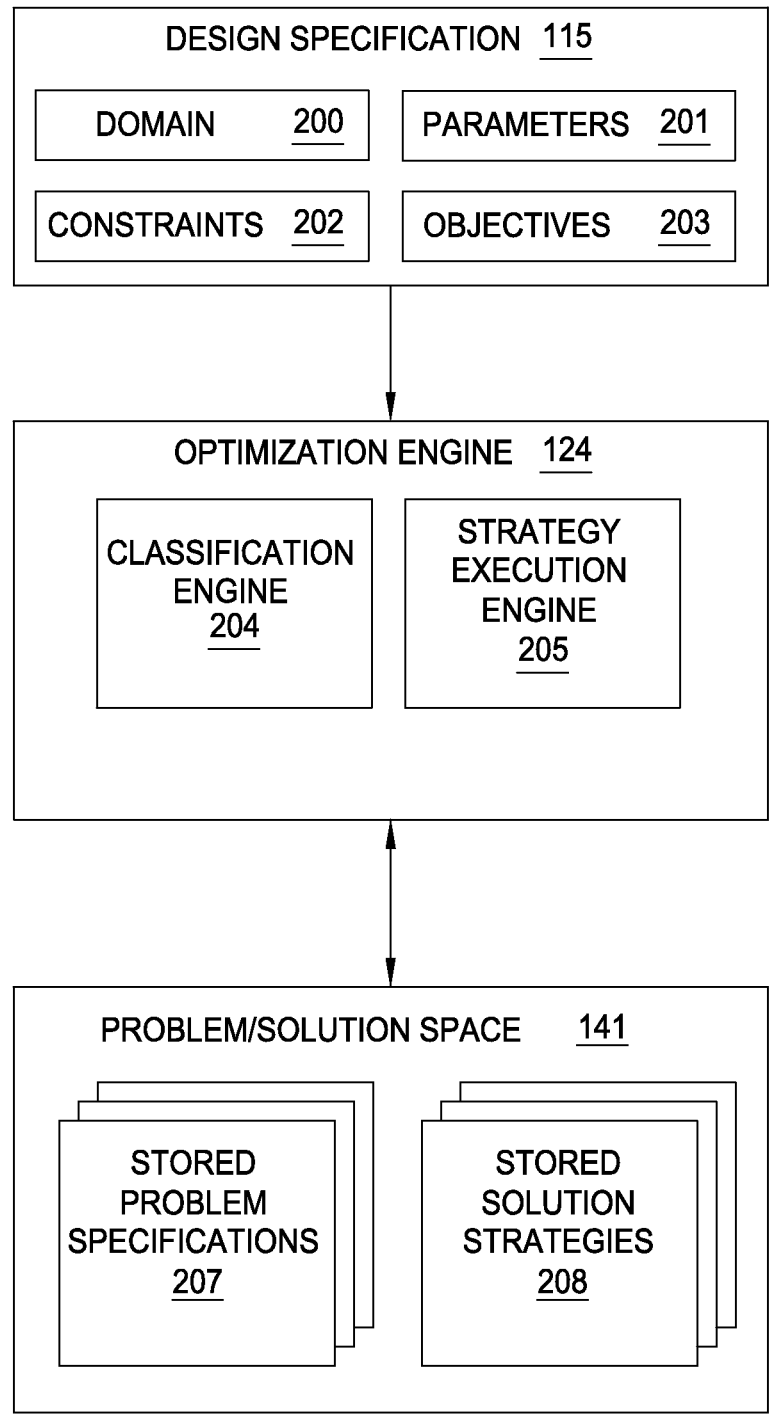
FIG. 2 illustrates data that is processed by the server machine of FIG. 1 to generate a solution to an optimization problem, according to one embodiment of the present invention.

FIG. 2 illustrates data that is processed by server machine 120 of FIG. 1 to generate a solution to the optimization problem associated with problem specification 115, according to one embodiment of the present invention. As shown, optimization engine 124 receives problem specification 115 and maps that problem specification into problem/solution space 141, as described above in conjunction with FIG. 1. Problem specification 115 includes different attributes associated with the optimization problem to be solved, such as domain 200, parameters 201, constraints 202, and objectives 203.

Domain 200 represents a particular class of optimization problems, such as "structural," "fluid dynamics," "logistics," and so forth. Parameters 201 represent a set of mathematical values that are to be optimized via the optimization process described herein. Constraints 202 represent limitations on the solution to the optimization problem. Constraints 202 could be explicit ranges for parameters 201, or a set of functions of those parameters 201 with specific output ranges, among other possibilities. Objectives 203 represent a set of functions to be maximized or minimized via the optimization process described herein. Objectives 203 could include, e.g., a set of cost functions that depend on parameters 201, among other types of objective functions.

Optimization engine 124 is configured to parse problem specification 115 and interpret the various data sets included in that problem specification. In doing so, optimization engine 124 may implement natural language processing, semantic analysis, and other forms of computer-implemented interpretation in order to pre-process problem specification 115 into a data structure having a particular mathematical format and a particular set of mathematical entities.

Once optimization engine 124 pre-processes problem specification 115 in the fashion described above, a classification engine 204 within optimization engine 124 is configured to map problem specification 115 into problem/solution space 141. Problem space 141 includes a collection of stored problem specifications 207 and a corresponding collection of stored solution strategies 208. Each stored problem specification 207 is associated with an optimization problem that optimization engine 124 previously attempted to solve. Each corresponding stored solution strategy 208 represents a previously implemented approach to solving that optimization problem and information that reflects the degree to which that approach was successful.

Classification engine 204 is configured to map problem specification 115 into problem/solution space 141 by generating a correlation value between problem specification 115 and each stored problem specification 207 within problem/solution space 141. Classification engine 204 may then identify stored problem specifications 207 that are similar to problem specification 115. For example, classification engine 204 may identify stored problem specifications 207 having a threshold correlation value with problem specification 115. Classification engine 204 then retrieves the stored solution strategy (or strategies) 208 associated with the identified problem specifications 207. As previously mentioned, the classification approach implemented by classification engine 204 is described in greater detail below in conjunction with FIGS. 4-5C. Once classification engine 204 identifies one or more stored solution strategies 208, strategy execution engine 205 then executes those identified solution strategies to generate a solution to the optimization problem.

A stored solution strategy 208 includes one or more optimization algorithms that may be applied to the optimization problem, a set of hyperparameters for each such optimization algorithm, and a set of termination conditions for each optimization algorithm. A stored solution strategy 208 also includes performance criteria that reflect the statistical performance of that solution strategy when applied to one or more previous optimization problems. An exemplary stored solution strategy 208 is described in greater detail below in conjunction with FIG. 3.

Figure 3:
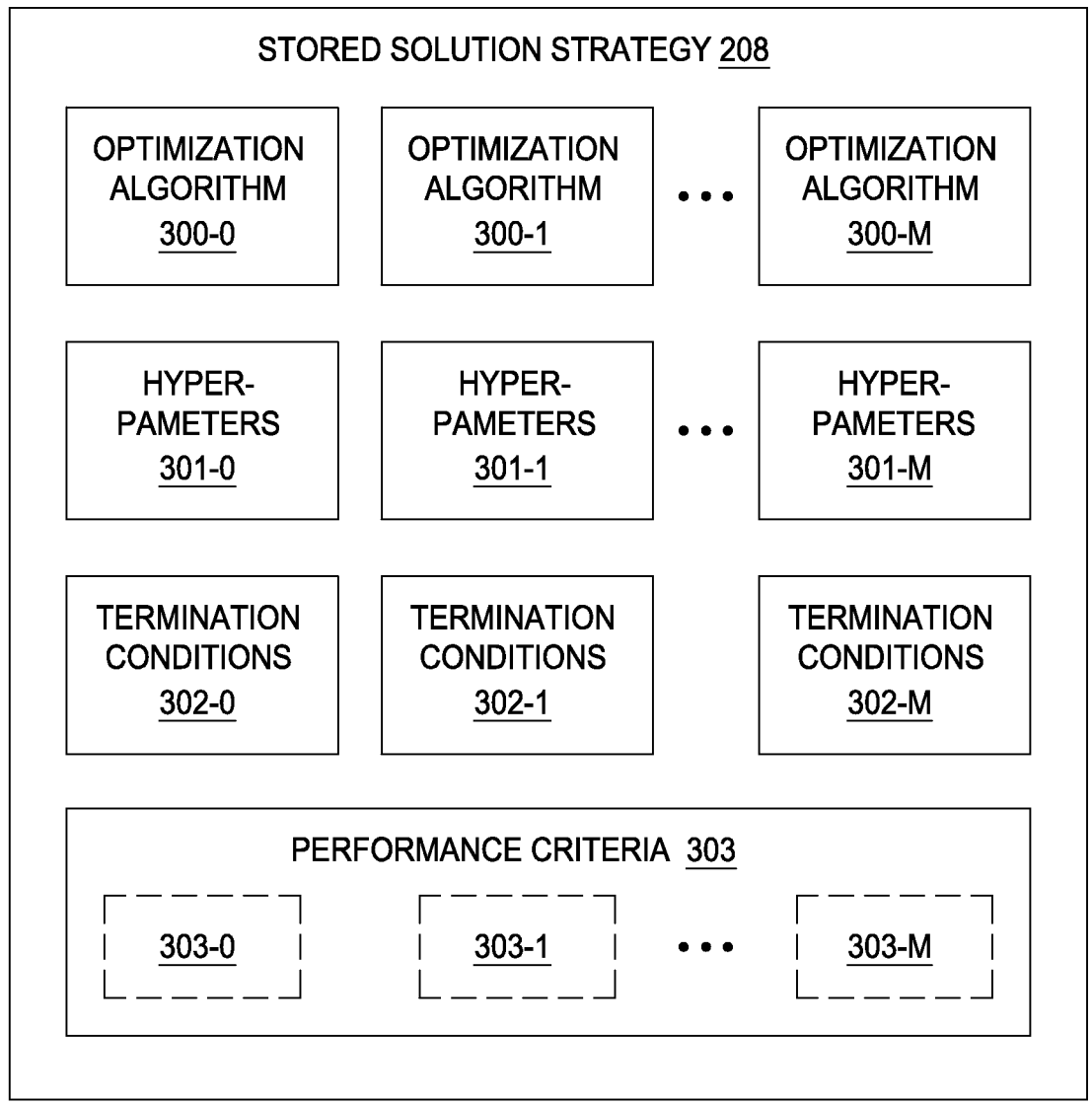
FIG. 3 illustrates a solution strategy that may be executed by the server machine of FIG. 1 to generate a solution to an optimization problem, according to one embodiment of the present invention

FIG. 3 illustrates a stored solution strategy 208 that may be executed by strategy execution engine 205 within optimization engine 124 to generate a solution to an optimization problem, according to one embodiment of the present invention. As shown, stored solution strategy 208 includes a sequence of optimization algorithms 300-0 through 300-M, a corresponding sequence of hyperparameters 301-0 through 301-M, and a corresponding sequence of termination conditions 302-0 through 302-M. Stored solution strategy 208 also includes performance criteria 303, which may be subdivided into performance criteria 303-0 through 303-M.

An optimization algorithm 300 could be, for example, a gradient descent algorithm, a simulated annealing algorithm, a genetic algorithm, or any other single-objective or multi-objective optimization algorithm. Hyperparameters 301 includes various values that influence the performance of the corresponding optimization algorithm 300. For example, hyperparameters 300 associated with a gradient descent algorithm could indicate a step size for traversing a solution space. In another example, hyperparameters 300 associated with a genetic algorithm could indicate a starting population size or number of generations to evaluate. Termination conditions 302 indicate when the execution of the corresponding optimization algorithm 300 should be terminated. For example, termination conditions 302 associated with a simulated annealing algorithm could indicate that the execution of that algorithm should be terminated after 10 minutes. Any given set of termination conditions 302 may also indicate a particular standard by which convergence may be detected, such as, e.g., a minimum difference between a current solution and an objective 203 that should be achieved.

Strategy execution engine 205 may execute stored solution strategy 208 as a whole by sequentially executing each optimization algorithm 300 with the corresponding set of hyperparameters 301 until any of the corresponding termination conditions 303 are met. If convergence is detected, then strategy execution engine 205 may terminate the execution of stored solution strategy 208. Strategy execution engine 205 may also monitor the performance of stored solution strategy 208 relative to performance criteria 303. Performance criteria 303 reflect the statistical performance of stored solution strategy 208 when applied to previous optimization problems. In one embodiment, performance criteria 303 may be subdivided into performance criteria 303-0 through 303-M, where each subdivision represents the statistical performance of a corresponding optimization algorithm 300. At any given time during the execution of stored solution strategy 208, strategy execution engine 205 may determine that performance criteria 303 are not being met. At that time, strategy execution engine 205 may terminate the execution of the stored solution strategy 208. As previously mentioned, the execution approach implement by strategy execution engine 205 is described in greater detail below in conjunction with FIGS. 6-7C.

Referring back now to FIG. 2, classification engine 204 and strategy execution engine 205 are configured to interoperate in order to implement the general functionality of optimization engine 124. In doing so, classification engine 204 and strategy execution engine 205 may acquire and execute one or more stored solution strategies 208 in order to generate a solution to the optimization problem defined by problem specification 115. Once a solution has been generated, optimization engine 124 returns that solution to the end-user via interface engine 114.

Classification of an Optimization Problem

Figure 4:
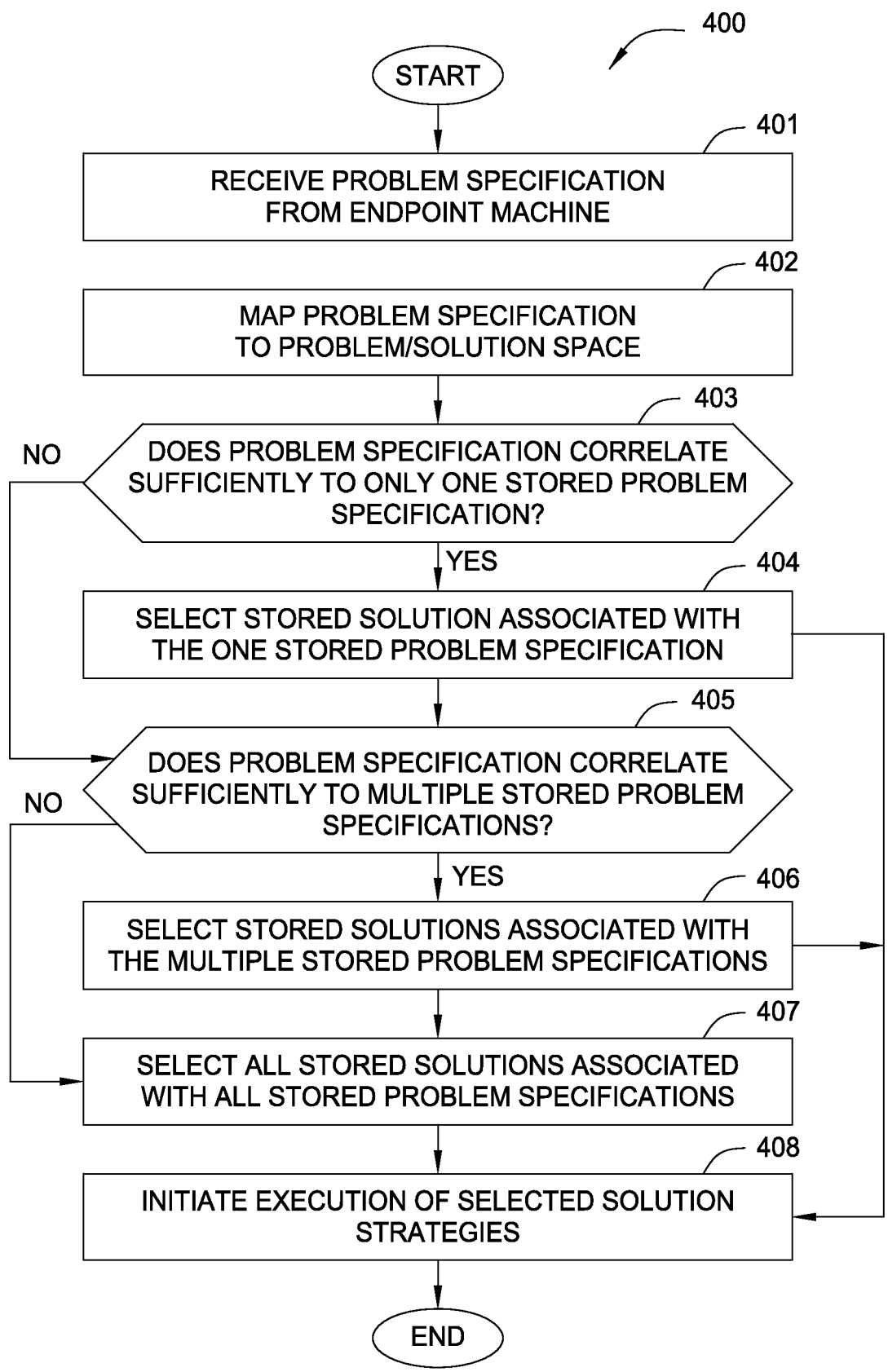
FIG. 4 is a flow diagram of method steps for classifying an optimization problem, according to one embodiment of the present invention.

FIG. 4 is a flow diagram of method steps for classifying an optimization problem, according to one embodiment of the present invention. Although the method steps are described in conjunction with the system of FIG. 1, persons skilled in the art will understand that any system configured to perform the method steps, in any order, is within the scope of the present invention.

As shown, a method 400 begins at step 400, where classification engine 204 within optimization engine 124 receives problem specification 115. At step 402, classification engine 204 maps problem specification 115 into problem/solution space 141. In doing so, classification engine 204 may generate a correlation value between problem specification 115 and each stored problem specification 207 in problem/solution space 141. A given correlation value reflects a degree of similarity between problem specification 115 and a given stored problem specification 207 in problem space 141.

At step 403, classification engine 204 determines whether problem specification 115 correlates sufficiently with only one stored problem specification 207 in problem/solution space 141. In the context of this disclosure, when the correlation value between problem specification 115 and a stored problem specification 207 exceeds a threshold value, then that correlation value is considered "sufficient."

If, at step 403, classification engine 204 determines that problem specification 115 correlates sufficiently with just one stored problem specification 207 in problem/solution space 141, then classification engine 204 proceeds to step 404. At step 404, classification engine 204 selects a stored solution strategy 208 that corresponds to the stored problem specification 207. Classification engine 204 then proceeds to step 408 and initiates the execution of the stored solution strategy 207 selected at step 404. An exemplary scenario where problem specification 115 correlates sufficiently to just one stored problem specification 207 is described, by way of example, below in conjunction with FIG. 5A.

If, at step 403, classification engine 204 determines that problem specification 115 does not correlate sufficiently with only one stored problem specification 207, then classification engine 204 proceeds to step 405. At step 405, classification engine 204 determines whether problem specification 115 correlates sufficiently with multiple stored problem specifications 207 in problem/solution space 141.

If, at step 405, classification engine 204 determines that problem specification 115 correlates sufficiently to multiple stored problem specifications 207 in problem/solution space 141, then classification engine 204 proceeds to step 406. At step 406, classification engine 204 selects multiple stored solution strategies 208 that correspond to the multiple stored problem specifications 207. Classification engine 204 then proceeds to step 408 and initiates the execution of the stored solution strategies 207 selected at step 406. An exemplary scenario where problem specification 115 correlates sufficiently to multiple stored problem specifications 207 is described, by way of example, below in conjunction with FIG. 5B.

At step 405, if classification engine 204 determines that problem specification 115 does not correlate sufficiently with multiple stored problem specifications 207, then classification engine 204 proceeds to step 407. At step 407, classification engine 204 selects all stored solution strategies 208 within problem/solution space 141. Classification engine 204 proceeds to step 407 when problem specification 115 does not correlate sufficiently to any stored problem specifications 207 in problem/solution space 141. Classification engine 204 then proceeds to step 409 and initiates the execution of the selected solution strategies 408. An exemplary scenario where problem specification 115 does not correlate sufficiently to any stored problem specifications 207 is described, by way of example, below in conjunction with FIG. 5C.

By implementing the method 400, classification engine 204 is configured to select one or more stored solution strategies that may be executed to generate a solution the optimization problem associated with problem specification 115. Classification engine 204 may select, one, multiple, or all stored problem specifications 207 in problem/solution space 141, as describe below in conjunction with FIGS. 5A, 5B, and 5C, respectively.

Figure 5A:
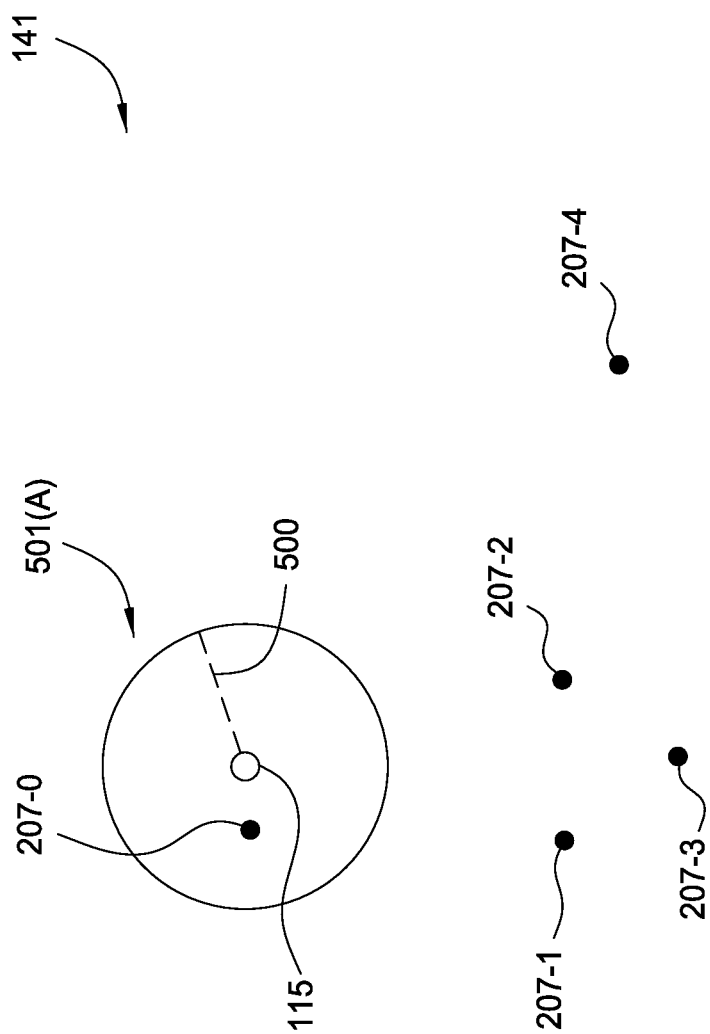

FIG. 5A illustrates an exemplary scenario that may occur when, at step 403 of the method 400, classification engine 204 determines that problem specification 115 correlates sufficiently to just one stored problem specification 207 in problem/solution space 141. As shown, problem/solution space 141 includes problem specifications 207-0 through 207-4 disposed at various positions. In the context of this example, problem/solution space 141 is depicted as a multi-dimensional spatial representation of stored problem specifications 207. In the following example (as well as those discussed below in conjunction with FIGS. 5B-5C), the position of a given stored problem specification 207 reflects particular attributes associated with that problem specification. Thus, similar problem specifications 207 are shown as residing close to one another.

In FIG. 5A, classification engine 204 places problem specification 115 at a position that is close to stored problem specification 207-0, indicating that those problem specifications share similar attributes. The shared attributes could be a shared problem domain, a shared set of parameters, a shared set of constraints, and/or a shared set of objectives. In practice, classification engine 204 may identify stored problem specification 207-0 as residing within a radius 500 of problem specification 115, where that radius defines a region 501(A). Classification engine 204 may implement an N-dimensional distance function to compute an N-dimensional distance value between problem specification 115 and each different stored problem specification 207, and then determine that only stored problem specification 207-0 falls within region 501(A). Classification engine 204 may then select the stored solution strategy 208 associated with stored problems specification 207-0 for execution by strategy execution engine 205.

Classification engine 204 may also identify multiple stored problem specifications 207, as described in greater detail below in conjunction with FIG. 5B.

Figure 5B:
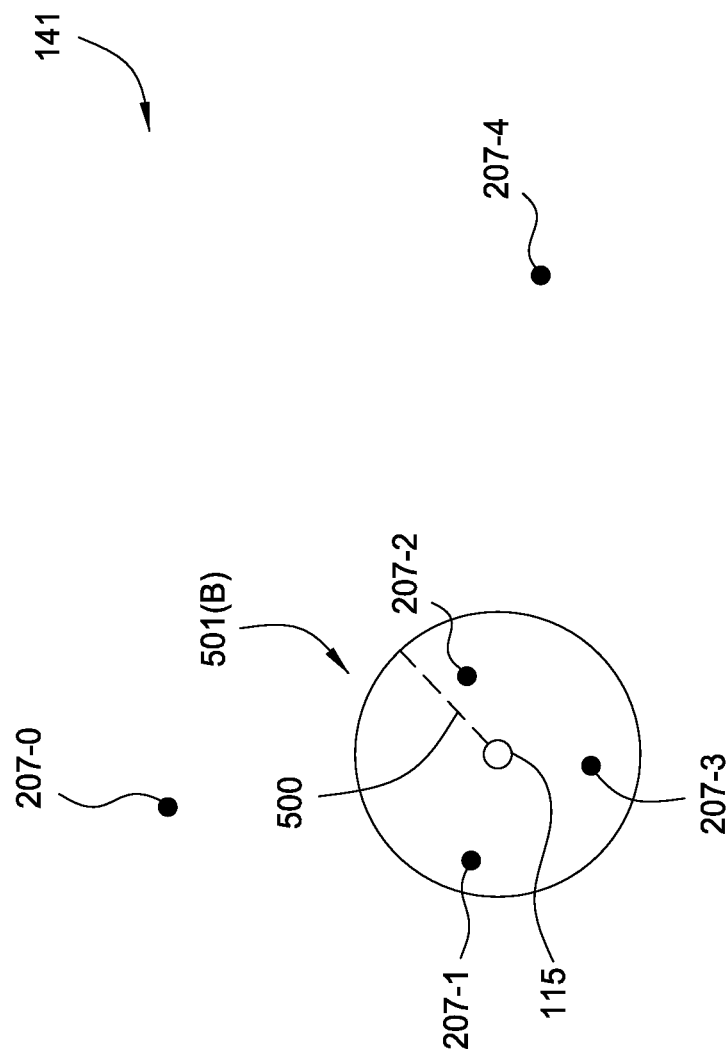

FIG. 5B illustrates an exemplary scenario that may occur when, at step 405 of the method 400, classification engine 204 determines that problem specification 115 correlates sufficiently to multiple stored problem specification 207 in problem/solution space 141. As shown, problem/solution space 141 includes problem specifications 207-0 through 207-4 disposed at various positions, similar to FIG. 5A. However, in FIG. 5B, classification engine 204 places problem specification 115 at a position close to stored problem specifications 207-1, 207-2, and 207-3, indicating that problem specification 115 shares similar attributes with each of those stored problem specifications. Similar to above, classification engine 204 establishes a region 501(B) within problem space 141 that includes stored problem specifications 207 that fall within radius 500 relative to problem specification 115. Classification engine 204 may then select the stored solution strategies 208 associated with each of stored problem specifications 207 for execution by strategy execution engine 205.

Classification engine 204 may also fail to identify any problem specifications 207 that are similar to problem specification 115, as described in greater detail below in conjunction with FIG. 5C.

FIG. 5C illustrates an exemplary scenario that may occur when problem specification 115 does not correlate sufficiently to any stored problem specifications 207 in problem/solution space 141. As shown, problem/solution space 141 includes problem specifications 207-0 through 207-4 disposed at various positions, similar to FIGS. 5A-5B. However, in FIG. 5C, classification engine 204 places problem specification 115 at a position that is not close to any of stored problem specifications 207, indicating that problem specification 115 is unique compared to those stored problem specifications. Similar to above, classification engine 204 establishes a region 501(C) within problem space 141, although region 501(C) does not include any stored problem specifications 207. When such a situation occurs, classification engine 204 may then select all stored solution strategies 208, i.e. those associated with each different stored problem specification 207 for execution by strategy execution engine 205.

Persons skilled in the art will recognize that the exemplary scenarios described above in conjunction with FIGS. 5A-5C are provided for illustrative purposes only, and are not meant to limit the scope of the invention. As a general matter, classification engine 204 is configured to classify problem specification 115 through any technically feasible approach to establishing correlation between a mathematical entity and one or more other mathematical entities. Once classification engine 204 has selected one or more stored solution strategies 208, strategy execution engine 205 may execute the selected solution strategy or strategies by implementing the approach described below in conjunction with FIGS. 6-7C.

Execution of a Solution Strategy

Figure 6:
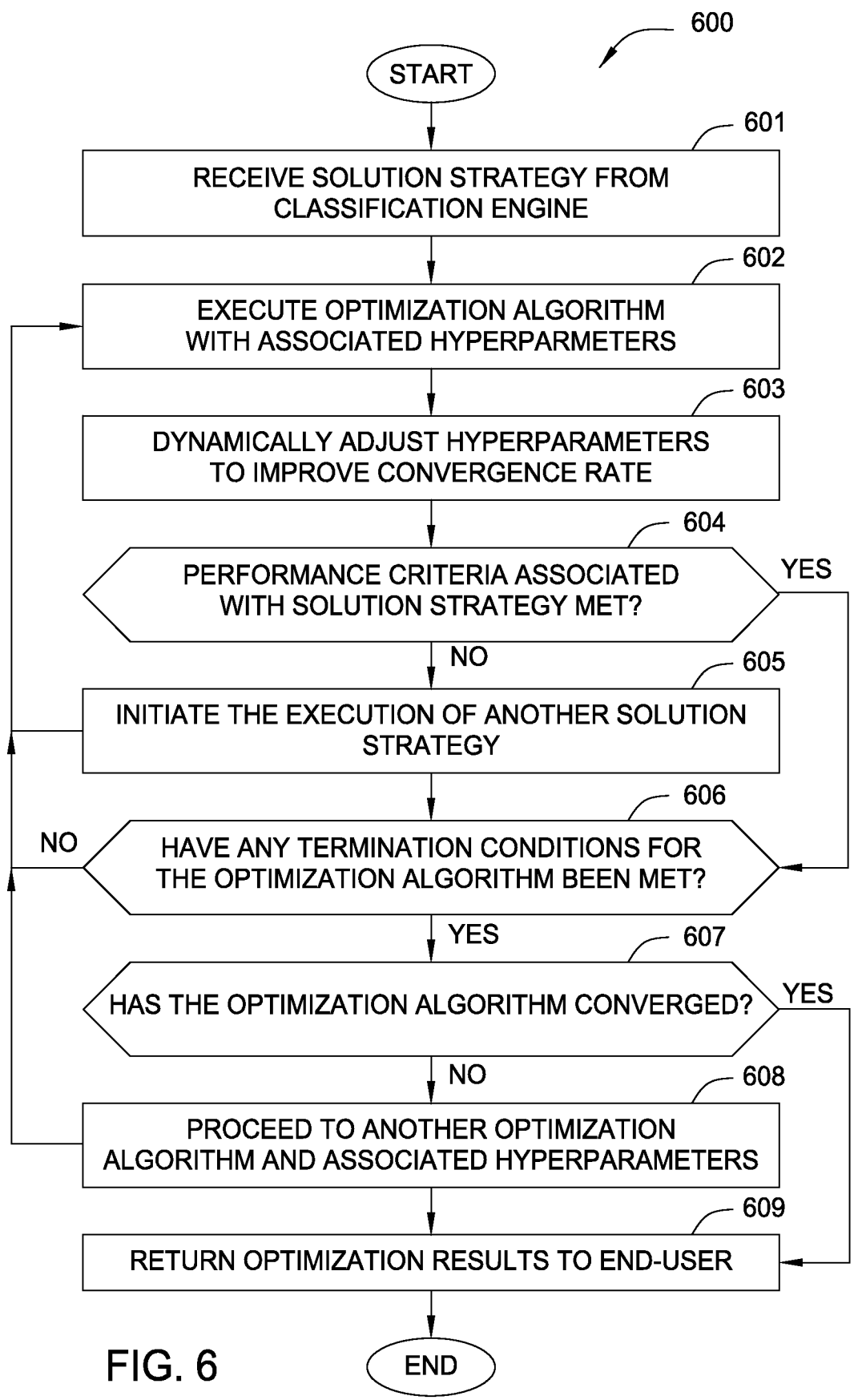
FIG. 6 is a flow diagram of method steps for generating a solution to an optimization problem, according to one embodiment of the present invention.

FIG. 6 is a flow diagram of method steps for generating a solution to an optimization problem, according to one embodiment of the present invention. Although the method steps are described in conjunction with the system of FIG. 1, persons skilled in the art will understand that any system configured to perform the method steps, in any order, is within the scope of the present invention.

As shown, a method 600 begins at step 601, where strategy execution engine 205 receives a stored solution strategy 208 from classification engine 204. In practice, strategy execution engine 205 may receive multiple stored solution strategies 208 from classification engine 204 and execute each one in parallel with the others. However, for the sake of simplicity, the execution of just one solution strategy 208 is discussed herein. At step 602, strategy execution engine 205 executes an optimization algorithm 300 with the associated hyperparameters 301. In doing so, strategy execution engine 205 may increment or decrement parameters 201, within the limitations provided by constraints 202, in order to meet objectives 203. At step 603, strategy execution engine 205 dynamically adjusts hyperparameters 301 to improve the convergence rate of the current optimization algorithm 300. In one embodiment, stored solution strategy 208 includes data indicating sensitivities of the current optimization algorithm 300 to changes in hyperparameters 301, and strategy execution engine 205 adjusts hyperparameters 301 according to those sensitivities.

At step 604, strategy execution engine 205 determines whether performance criteria 303 associated the current stored solution strategy 208 are being met. Strategy execution engine 205 generally performs step 603 on an ongoing basis to determine whether the current stored solution strategy 208 is performing as expected. If, at step 604, strategy execution engine 205 determines that performance criteria 303 are not being met, then strategy execution engine 205 may terminate the execution of the current solution strategy 208. At step 605, strategy execution engine 205 may then initiate the execution of another stored solution strategy 208 to replace the current solution strategy 208.

If, at step 604, strategy execution engine 205 determines that performance criteria 303 are, in fact, being met, then strategy execution engine 205 proceeds to step 606. At step 606, strategy execution engine 205 determines whether any termination conditions 302 associated with the current optimization algorithm 300 have been met. The termination conditions could reflect a convergence rate or degree of convergence, an amount of time to execute the current optimization algorithm 300, a number of generations to employ, and so forth. If strategy execution engine 205 determines that any termination conditions 302 have not been met, then strategy execution engine 205 return to step 602 and continues to execute the current optimization algorithm 300.

Otherwise, if strategy execution engine 205 determines at step 606 that any termination conditions 302 have been met, then strategy execution engine 205 proceeds to step 607. At step 607, strategy execution engine 205 determines whether the current optimization algorithm 300 has converged. If so, then strategy execution engine 205 proceeds to step 609 and return the results of the optimization algorithm 300, including a set of parameters 201 that have been optimized, to the end-user.

If strategy execution engine 205 determines at step 607 that the current optimization algorithm 300 has not yet converged, then strategy execution engine 205 proceeds to step 608. At step 608, strategy execution engine 205 initiates the execution of a subsequent optimization algorithm 300 in the sequence of optimization algorithms prescribed by the current solution strategy 208. Strategy execution engine 205 then returns to step 602 and proceeds to execute the subsequent optimization algorithm 300.

By implementing the method 600, strategy execution engine 205 is configured to execute a sequence of optimization algorithms included within a stored solution strategy 208 selected by classification engine 204. In doing so, strategy execution engine 205 monitors the performance of each optimization algorithm 300, as well as the performance of the stored solution strategy 208 as a whole. Strategy execution engine 205 may adjust hyperparameters 301 associated with a given optimization algorithm 300 to improve the performance of that algorithm, as described by way of example below in conjunction with FIGS. 7A-7B. Strategy execution engine 205 may also terminate the execution of the current stored solution strategy 208 when the performance of that strategy falls below statistical expectations. Then, strategy execution engine 205 may initiate the execution of another stored solution strategy 208, as described by way of example below in conjunction with FIG. 7C.

FIG. 7A is a conceptual diagram that illustrates exemplary performance of an optimization algorithm 300, according to one embodiment of the present invention. As shown, an objective curve 700 is displayed against axes 740 and 780. Axes 740 and 780 correspond to different parameters 201, and the space defined by those axes represents a parameter space. Objective curve 700 corresponds to the output of an objective function of those parameters 201 within the parameter space. The objective function is included within objectives 203 and has a dimensionality equal to the number of parameters 201. As such, each unique position on objective curve 700 represents a unique combination of parameters 201 that meets constraints 202. Persons skilled in the art will recognize that objective curve 700 is depicted as a two-dimensional parabola for the sake of simplicity, and that the concepts described herein are applicable to a parameter space and objective curve having any dimensionality.

Within objective curve 700, position 701 corresponds to a set of parameters 201 generated by optimization algorithm 300. Optimization algorithm 300 is configured to descend optimization curve 700 a distance 702 to a position 703 by adjusting those parameters. Position 703 corresponds to the adjusted set of parameters 201. In this fashion, optimization algorithm 300 may approach optimal position 720. Optimal position 720 represents a combination of parameters 201 that minimizes objective curve 700, as is shown. Distance 702 generally reflects a convergence rate associated with the optimization algorithm. That convergence rate may be sensitive to specific hyperparameters 301 associated with the optimization algorithm 300. Strategy execution engine 205 is configured to adjust hyperparameters 301 to improve the convergence rate of optimization algorithm 300 based on those sensitivities, as described in greater detail below in conjunction with FIG. 7B.

Figure 7B:
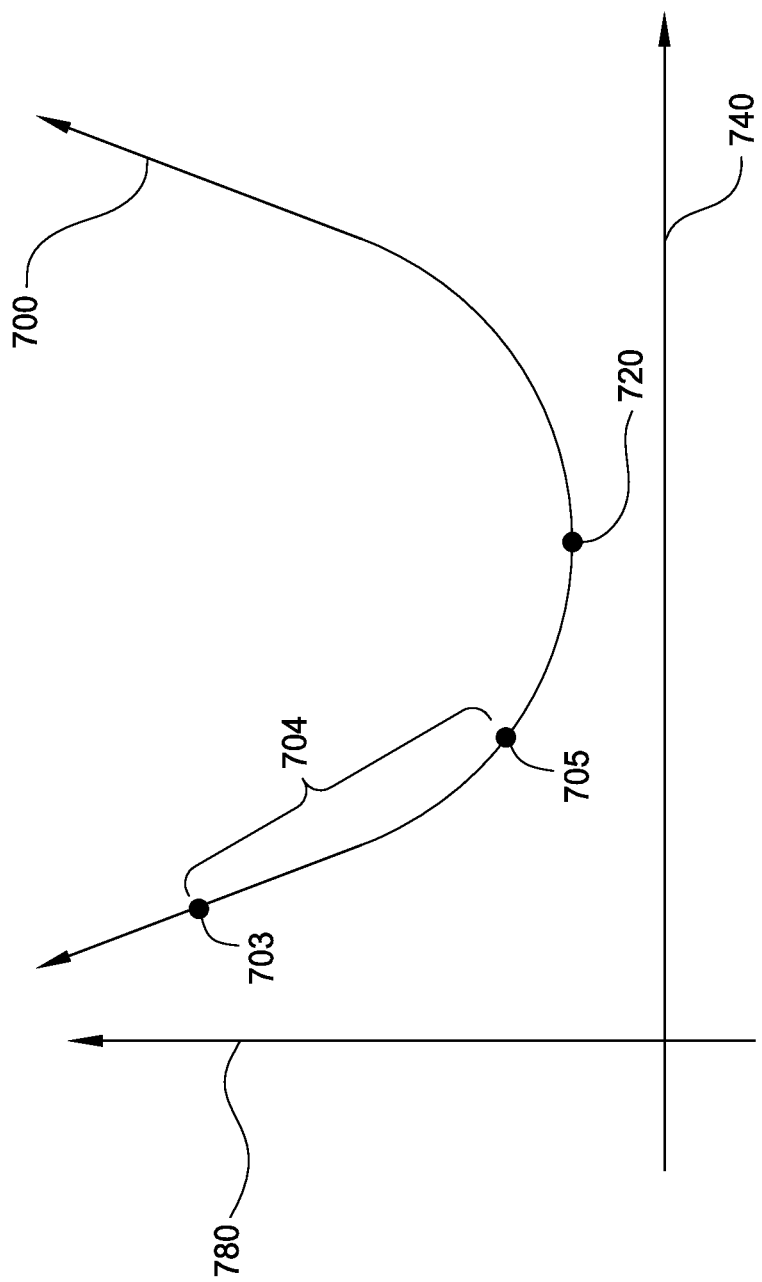

FIG. 7B is a conceptual diagram that illustrates exemplary performance of an optimization algorithm 300, according to one embodiment of the present invention. Once strategy execution engine 205 has adjusted hyperparameters 301 associated with optimization algorithm 300, that algorithm may traverse objective curve 700 a distance 704 to a position 705 that is closer to optimal position 720 compared to the initial position 701 of FIG. 7A, as is shown. In the example discussed herein, optimization algorithm 300 could be a gradient descent algorithm, and the hyperparameter subject to adjustment could be a step size. However, persons skilled in the art will understand that strategy execution engine 205 could adjust any hyperparameter of any optimization algorithm to improve a convergence rate of that algorithm. Strategy execution engine 205 may also perform such adjustment relative to an established sensitivity between hyperparameter and convergence rate, as mentioned above. Strategy execution engine 205 may also terminate the current stored solution strategy 208 and initiate the execution of another stored solution strategy 208 when any given optimization algorithm 300 associated with that stored solution strategy underperforms, as described below in conjunction with FIG. 7C.

Figure 7C:
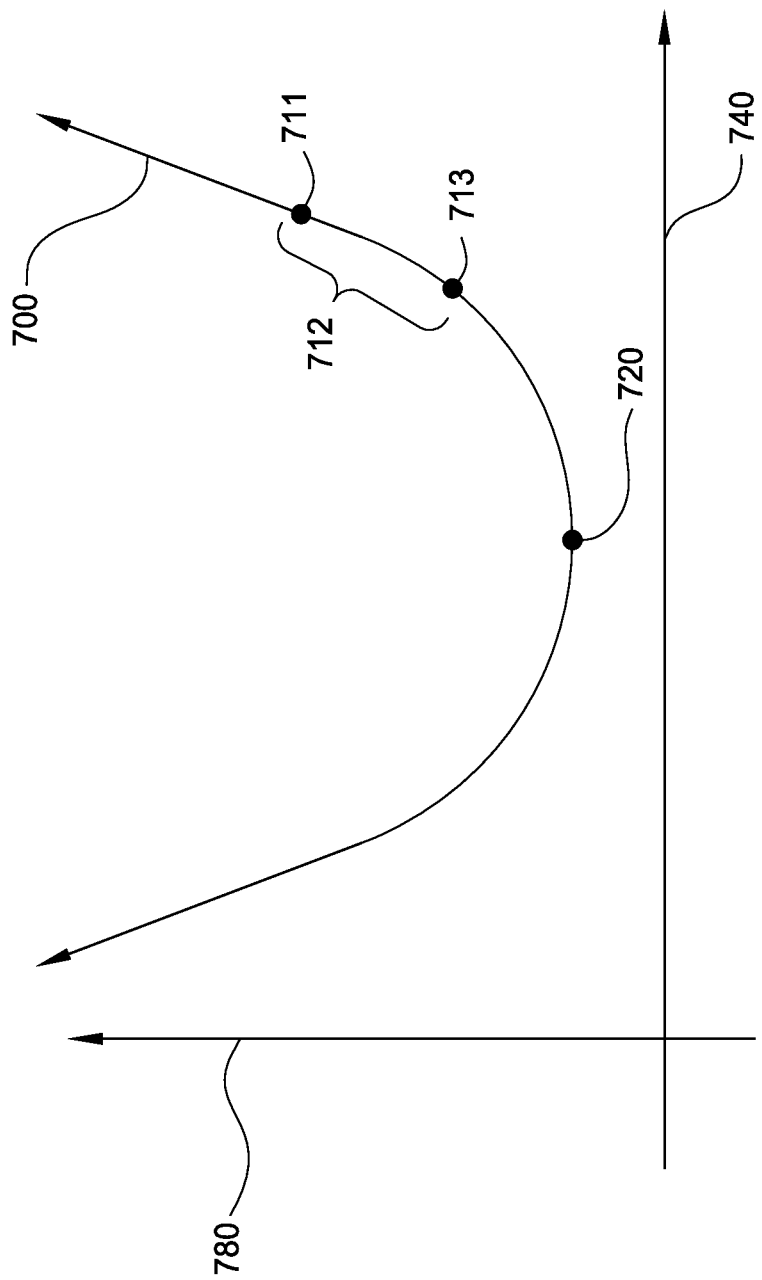

FIG. 7C is a conceptual diagram that illustrates exemplary performance of an optimization algorithm 300, according to one embodiment of the present invention. The exemplary scenario shown in FIG. 7C could occur when strategy execution engine 205 terminates the execution of a previous stored solution strategy 208 (e.g., due to underperformance), and initiates a new optimization algorithm 300 associated with another stored solution strategy 208. As is shown, the new optimization algorithm 300 begins at a position 711 on objective curve 700 and then proceeds a distance 711 along that curve to position 713. Generally, the new optimization algorithm 300 may attempt to traverse objective curve 300 from a new starting point to arrive at optimal position 720.

Referring generally to FIGS. 7A-7C, persons skilled in the art will understand that the exemplary scenarios discussed herein are provided for illustrative purposes, and are not meant to limit the scope of the present invention. As a general matter, strategy execution engine 205 may execute any optimization algorithm 300 to traverse any objective curve or curves in order to identify a set of parameters 201 that meets objectives 202.

Persons skilled in the art may notice that the general approach described herein of classifying a problem and then executing a corresponding solution could also be applied recursively to select classification algorithms. In other words, an optimization algorithm could be applied to search a problem/solution space that includes other optimization algorithms, as described in greater detail below in conjunction with FIG. 8.

Figure 8:
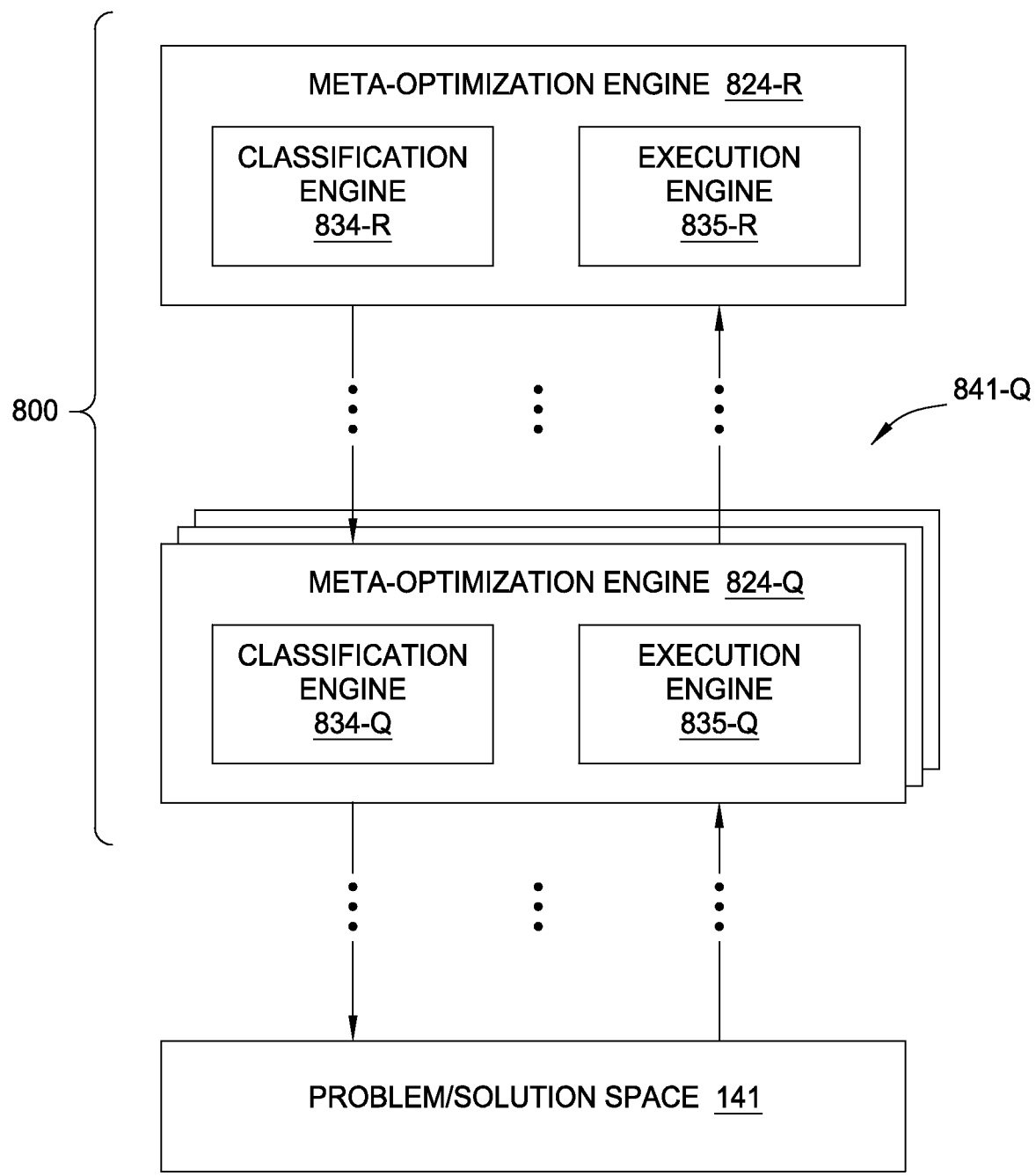
FIG. 8 is a conceptual diagram illustrating a hierarchy of optimizations engines, according to one embodiment of the present invention.

FIG. 8 is a conceptual diagram illustrating a hierarchy 800 of meta-optimization engines 824, according to one embodiment of the present invention. As shown, a meta-optimization engine 824-R resides at the top of hierarchy 800, while multiple meta-optimization engines 824-Q resides below meta-optimization engine 824-R. Problem/solution space 141 resides below hierarchy 800. Meta-optimization engine 824-R includes a classification engine 834-R and an execution engine 835-R.

Classification engine 834-R is configured to search within meta-optimization engines 824-Q to identify a classification engine 834-Q with which to search a lower level of hierarchy 800. Once a classification engine 834-Q has been identified, execution engine 835-Q executes that classification engine to search a lower level of hierarchy 800. In this fashion, each meta-optimization engine 824 searches within a set of meta-optimization engines residing lower in hierarchy 800. At the lowest level of hierarchy 800, a final meta-optimization engine 824 searches within problem/solution space 141 to classify problem specification 115 and identify a stored solution strategy 208 that can be executed to solve the associated optimization problem.

With this approach, the classification technique described above in conjunction with FIGS. 4-5C, itself can be optimized to improve the speed and accuracy with which a problem specification 115 may be classified and solved.

In sum, a centralized optimization engine is configured to receive a problem specification that defines an optimization problem to be solved. The optimization engine classifies the problem specification within a large dataset of previously solved optimization problems. The optimization engine selects one or more solution strategies associated with similar optimization problems, and then executes those solution strategies to solve the optimization problem. Over time, the optimization engine updates the large data set with statistical information that reflects the performance of different solution strategies applied to various optimization problems, thereby increasing the effectiveness with which optimization problems may be solved.

Advantageously, the end-user is not required to have domain-specific knowledge of optimization techniques, and so a much wider class of end-users may be capable of solving optimization problems. Further, optimization problems can be solved with much greater speed and accuracy by leveraging the compute power of a cloud-based optimization engine. By recording the statistical performance of different solution strategies applied to various optimization problems, the performance of the optimization engine may improve over time.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for solving an optimization problem, the method comprising:
    receiving a problem specification that reflects the optimization problem;
    identifying a plurality of stored problem specifications included in a problem/solution space, wherein:
        the problem/solution space comprises a spatial representation of the plurality of stored problem specifications,
        a position of each stored problem specification within the problem/solution space is determined based on a given set of attributes associated with the stored problem specification, and
        each of the plurality of stored problem specifications corresponds to a stored solution strategy also included in the problem/solution space;
    assigning, based on a set of attributes associated with the problem specification, a position for the problem specification in the problem/solution space;
    for each stored problem specification in the plurality of stored problem specifications, computing a distance value between the problem specification and the stored problem specification;
    identifying, based on the distance values computed for the plurality of stored problem specifications, one or more stored problem specifications in the plurality of stored problem specifications that are below a threshold distance value;
    selecting one or more stored solution strategies in a plurality of stored solution strategies that correspond to the one or more identified stored problem specifications; and
    executing the one or more stored solution strategies to generate a solution to the optimization problem.

2. The computer-implemented method of claim 1, wherein the set of attributes associated with the problem specification includes at least one of:
    a problem domain associated with the problem specification,
    a set of parameters associated with the problem specification,
    a set of constraints associated with the problem specification, or
    a set of objectives associated with the problem specification.

3. The computer-implemented method of claim 1, wherein a first stored solution strategy included in the one or more stored solution strategies includes at least one of:
    a set of optimization algorithms,
    a set of hyperparameters, or
    a set of termination conditions.

4. The computer-implemented method of claim 3, wherein executing the one or more solution strategies comprises executing the first stored solution strategy by:
    executing, with a first subset of hyperparameters in the set of hyperparameters, a first optimization algorithm in the set of optimization algorithms;
    adjusting the first subset of hyperparameters to improve a convergence rate associated with the first optimization algorithm;
    determining that the first optimization algorithm has converged; and
    returning, to an end-user, the solution to the optimization problem as an optimized set of parameters generated by the first optimization algorithm.

5. The computer-implemented method of claim 3, wherein executing the one or more stored solution strategies comprises executing the first stored solution strategy by:
    executing, with a first subset of hyperparameters in the set of hyperparameters, a first optimization algorithm in the set of optimization algorithms until a first subset of termination conditions in the set of termination conditions has been met; and
    executing, with a second subset of hyperparameters in the set of hyperparameters, a second optimization algorithm in the set of optimization algorithms until a second subset of termination conditions in the set of termination conditions has been met.

6. The computer-implemented method of claim 3, wherein:
    the first stored solution strategy further includes a set of performance criteria that reflects a statistical convergence rate associated with the stored solution strategy, and
    executing the one or more stored solution strategies comprises executing the first stored solution strategy by executing, with a first subset of hyperparameters in the set of hyperparameters, a first optimization algorithm in the set of optimization algorithms until a convergence rate associated with the first stored solution strategy falls below the statistical convergence rate associated with the stored solution strategy.

7. The computer-implemented method of claim 6, further comprising updating the problem/solution space to include:
    the problem specification; and
    information that associates the problem specification with the one or more stored solution strategies.

8. The method of claim 1, wherein the distance value is calculated based on:
    a set of objective functions associated with the problem specification; and
    a second set of objective functions associated with the stored problem specification.

9. The method of claim 8, wherein the set of objective functions comprise a set of functions to be maximized or minimized in the optimization problem.

10. The method of claim 1, wherein executing the one or more stored solution strategies comprises:
    monitoring an execution of a first stored solution strategy in the one or more stored solution strategies;
    determining that performance associated with the execution of the first stored solution strategy falls below an expected performance associated with the first stored solution strategy; and
    in response to determining that the performance associated with the execution of the first stored solution strategy falls below the expected performance:
        terminating the execution of the first stored solution strategy, and
        initiating an execution of a second stored solution strategy in the one or more stored solution strategies.

11. One or more non-transitory computer-readable media storing program instructions that, when executed by one or more processors, cause the one or more processors to solve an optimization problem by performing the steps of:
receiving a problem specification that reflects the optimization problem;
identifying a plurality of stored problem specifications included in a problem/solution space, wherein:
the problem/solution space comprises a spatial representation of the plurality of stored problem specifications,
a position of each stored problem specification within the problem/solution space is determined based on a given set of attributes associated with the stored problem specification, and
each of the plurality of stored problem specifications corresponds to a stored solution strategy also included in the problem/solution space;
assigning, based on a set of attributes associated with the problem specification, a position for the problem specification in the problem/solution space;
for each stored problem specification in the plurality of stored problem specifications, computing a distance value between the problem specification and the stored problem specification;
identifying, based on the distance values computed for the plurality of stored problem specifications, one or more stored problem specifications in the plurality of stored problem specifications that are below a threshold distance value;
selecting one or more stored solution strategies in a plurality of stored solution strategies that correspond to the one or more identified stored problem specifications; and
executing the one or more stored solution strategies to generate a solution to the optimization problem.

12. The one or more non-transitory computer-readable media of claim 11, wherein the set of attributes associated with the problem specification includes at least one of:
a problem domain associated with the problem specification,
a set of parameters associated with the problem specification,
a set of constraints associated with the problem specification, or
a set of objectives associated with the problem specification.

13. The one or more non-transitory computer-readable media claim 11, wherein a first stored solution strategy included in the one or more stored solution strategies includes at least one of:
a set of optimization algorithms,
a set of hyperparameters, or
a set of termination conditions.

14. The one or more non-transitory computer-readable media claim 13, wherein the step of executing the one or more solution strategies comprises executing the first stored solution strategy by:
executing, with a first subset of hyperparameters in the set of hyperparameters; a first optimization algorithm in the set of optimization algorithms;
adjusting the first subset of hyperparameters to improve a convergence rate associated with the first optimization algorithm;
determining that the first optimization algorithm has converged; and
returning, to an end-user, the solution to the optimization problem as an optimized set of parameters generated by the first optimization algorithm.

15. The one or more non-transitory computer-readable media claim 13, wherein the step of executing the one or more stored solution strategies comprises executing the first stored solution strategy by:
executing, with a first subset of hyperparameters in the set of hyperparameters, a first optimization algorithm in the set of optimization algorithms until a first subset of termination conditions in the set of termination conditions has been met; and
executing, with a second subset of hyperparameters in the set of hyperparameters, a second optimization algorithm in the set of optimization algorithms until a second subset of termination conditions in the set of termination conditions has been met.

16. The one or more non-transitory computer-readable media claim 13, wherein:
the first stored solution strategy further includes a set of performance criteria that reflects a statistical convergence rate associated with the stored solution strategy, and
executing the one or more stored solution strategies comprises executing the first stored solution strategy by executing, with a first subset of hyperparameters in the set of hyperparameters, a first optimization algorithm in the set of optimization algorithms until a convergence rate associated with the first stored solution strategy falls below the statistical convergence rate associated with the stored solution strategy.

17. The one or more non-transitory computer-readable media claim 16, further comprising the step of updating the problem/solution space to include:
the problem specification; and
information that associates the problem specification with the one or more stored solution strategies.

18. A computing device configured to solve an optimization problem, comprising:
a memory unit; and
a processing unit, coupled to the memory unit, that:
receives a problem specification that reflects the optimization problem;
identifies a plurality of stored problem specifications included in a problem/solution space, wherein:
the problem/solution space comprises a spatial representation of the plurality of stored problem specifications,
a position of each stored problem specification within the problem/solution space is determined based on a given set of attributes associated with the stored problem specification, and
each of the plurality of stored problem specifications corresponds to a stored solution strategy also included in the problem/solution space;
assigns, based on a set of attributes associated with the problem specification,
for each stored problem specification in the plurality of stored problem specifications, computes a distance value between the problem specification and the stored problem specification;
identifies, based on the distance values computed for the plurality of stored problem specifications, one or more stored problem specifications in the plurality of stored problem specifications that are below a threshold distance value;

selects one or more stored solution strategies in a plurality of stored solution strategies that correspond to the one or more identified stored problem specifications; and executes the one or more stored solution strategies to generate a solution to the optimization problem.

* * * * *